United States Patent [19]

Reynolds et al.

[11] Patent Number: 4,541,610
[45] Date of Patent: Sep. 17, 1985

[54] FLUID FLOW CONTROL VALVE ASSEMBLIES

[75] Inventors: Desmond H. J. Reynolds; Phillip A. Taft, both of West Midlands, England

[73] Assignee: Lucas Industries, Birmingham, England

[21] Appl. No.: 550,806

[22] Filed: Nov. 14, 1983

[30] Foreign Application Priority Data

Nov. 24, 1982 [GB] United Kingdom ............... 8233554

[51] Int. Cl.⁴ ............................................. F16K 31/02
[52] U.S. Cl. ............................................. 251/129.21
[58] Field of Search ............... 137/269.5, 493.1, 493.9, 137/614.18, 630.19; 251/83, 139

[56] References Cited

U.S. PATENT DOCUMENTS

| | | | |
|---|---|---|---|
| 2,623,541 | 12/1952 | Seppmann | 251/139 X |
| 3,446,246 | 5/1969 | Huley | 251/139 X |
| 3,521,851 | 7/1970 | Sorrow | 251/139 X |
| 3,589,391 | 6/1971 | Pagliaro | 251/139 X |
| 4,403,765 | 9/1983 | Fisher | 251/139 X |

Primary Examiner—A. Michael Chambers
Assistant Examiner—John C. Fox
Attorney, Agent, or Firm—Oldham, Oldham & Weber Co.

[57] ABSTRACT

A fluid flow control valve assembly has a housing with first and second ports, and a valve mechanism for controlling fluid flow by closing either port or permitting fluid flow between them. The valve mechanism comprises two relatively movable members, a first member for controlling flow through the first port in response to a first spring, a solenoid, and the pressure differential across the first member; and a second member for controlling flow through the second port in response to the first member, the pressure differential across the second member and a second spring.

8 Claims, 1 Drawing Figure

U.S. Patent  Sep. 17, 1985  4,541,610
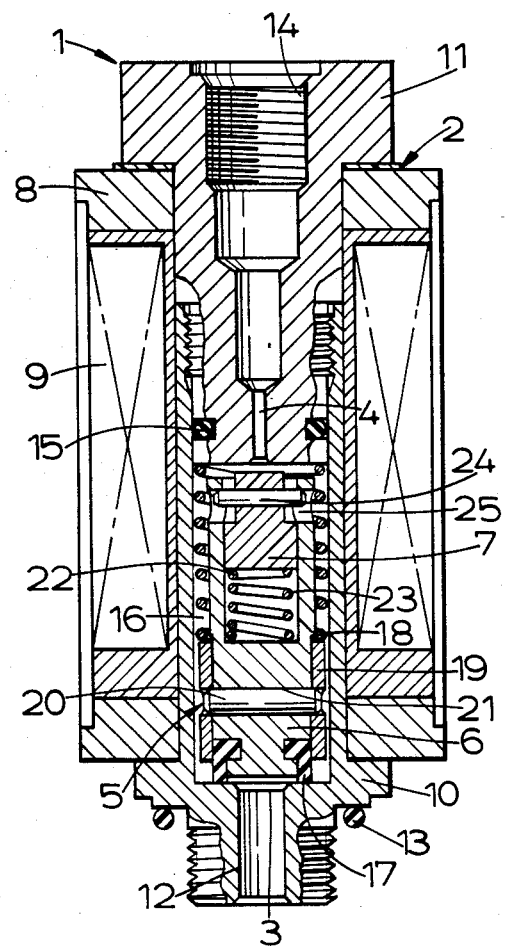

FLUID FLOW CONTROL VALVE ASSEMBLIES

SPECIFIC DESCRIPTION

This invention relates to a fluid flow control valve assembly of the kind having a housing with first and second ports, and valve means for controlling fluid flow between the ports, the valve means being movable to close either the first or the second port, or to permit communication between the ports.

In control valve assemblies of the kind set forth it is desirable to have simple construction and operation, and to provide positive closure of the ports by the valve means.

According to our invention, the valve means comprises two relatively movable valve members, a first valve member for controlling fluid flow through the first port, movement of the first valve member being controlled by first biassing means urging the first valve member to close the first port, a valve-operating means for producing a force urging the first valve member to open the first port, and the pressure differential across the first valve member, and a second valve member for controlling fluid flow through the second port, movement of the second valve member being controlled by the first valve member, the pressure differential across the second valve member, and second biassing means urging the second valve member to close the second port.

In this arrangement the biassing means provide positive closure of each port by the respective valve member and the construction and operation of the assembly are simple.

The valve-operating means conveniently comprises a solenoid.

The first and second biassing means preferably comprise first and second springs.

The second valve member preferably works in a bore in the first valve member. The valve members may be connected by a mechanism providing limited relative movement between the valve members. This mechanism may comprise a pin and slot connection.

When the solenoid is de-energised, operation of the valve means depends on the pressure differential and the biassing means. When the pressure differential acts with the first biassing means, the first valve member closes the first port, while the second port is open. When the pressure differential is reversed, it acts against the first biassing means to move the first valve member to open the first port, without closing the second port, to allow communication between the ports.

On energisation of the solenoid the first valve member moves to open the first port, and the position of the second valve member depends on the pressure differential and the second biassing means. When the pressure differential acts with the second biassing means the second port is closed by the second valve member. When the pressure differential is reversed, it acts against the second biassing means to move the second valve member to open the second port, allowing communication between the ports.

The solenoid may be chosen so that energisation of the solenoid produces a force which is unable to move the first valve member against a significant pressure differential. However, once the first valve member is moved in response to energisation of the solenoid to open the first port, it remains open as long as the solenoid remains energised, regardless of the pressure differential. This may be useful if the assembly is incorporated in a high pressure system, as it reduces the force required to operate the solenoid.

One embodiment of our invention is illustrated in the accompanying drawings of which the single FIGURE is a longitudinal section through a fluid flow control valve assembly.

The assembly 1 shown in the drawing has a housing 2 with first and second ports 3, 4 for connection into an hydraulic system (not shown). The first port 3 may be connected to a pressure source, and the second port 4 to a slave unit. The assembly 1 also has a valve means 5 controlling flow between the ports 3, 4, and comprising first and second valve members 6, 7 for controlling flow through the respective ports.

The housing 2 has a cylindrical housing portion 8 in which is located a valve-operating means comprising a solenoid winding 9. Two housing end portions 10, 11 of stepped outline are also provided. The first of these, 10, is of non-magnetic material and has a stepped bore 12, part of which forms the first port 3. A seal 13 seals the connection between the first port 3 and the system. The second end portion 11 is of magnetic material, and has a stepped bore 14, an inner portion of which forms the second port 4. At its outer end the bore 14 is screw-threaded for connection to the system. A seal 15 seals between the two end portions 10, 11. A cavity 16 is defined between the two end portions 10, 11, in which is located the valve means 5.

The two valve members 6, 7 are relatively movable. The first valve member 6 has a rubber seat 17 to provide a substantially leakproof seal when the first port 3 is closed by the first valve member. Any other suitable elastomeric material may be used for the seat 17. The valve member 6 is urged to close the first port 3 by first biassing means comprising a spring 18, which acts between the end portion 11 and an abutment ring 19 located round the first valve member 6. The abutment ring 19 is attached to the first valve member 6 by a pin 20 which passes through a diametrical hole 21 in the valve member 6. The first valve member 6 is of magnetic material so that it is responsive to energisation and de-energisation of the solenoid 9, and is also responsive to the pressure differential across it. In this embodiment the arrangement is such that energisation of the solenoid 9 magnetises the stationary end portion 11 and the valve member 6, which produces a force urging the valve member 6 inwardly in order to open the first port 3, but this force is not sufficient to move the valve member 6 against a significant pressure differential.

The second valve member 7 is adapted to control fluid flow through the second port 4. The second valve member 7 slides in a blind bore 22 at the inner end of the first valve member 6, and is urged towards the second port 4 by second biassing means comprising a spring 23 acting between the first and second valve members. The second valve member 7 is connected to the first valve member 6 by a pin 24 working in a slot 25 in the first valve member, to provide limited relative movement between the valve members. The second valve member 7 is therefore controlled by the first valve member 6 and the spring 23, and also by the pressure differential acting across it. However, the solenoid 9 does not affect the second valve member 7, which is of non-magnetic material.

The assembly 1 is arranged so that when the solenoid 9 is de-energised the position of the valve means 5 depends on the pressure differential and the biassing means. If the pressure acting at the second port 4 is greater than the pressure acting at the first port 3 the assembly is in the position shown, with the pressure differential and the first spring 18 acting to ensure that the first valve member 6 closes the first port 3. The second port 4, however, remains open. If the pressure differential is the other way round, the pressure differential acts against the first spring, and the valve members move into a balanced state in which both the first and second ports 3 and 4 are open, thus permitting fluid flow.

Energisation of the solenoid 9 moves the first valve member 6 into abutment with the inner end of the housing end portion 11 and opens the first port 3, provided that there is no significant pressure differential opposing the solenoid force. Once the first valve member 6 is in this position it remains there as long as the solenoid is energised, regardless of the pressure differential. The position of the second valve member 7 is then dependent on the pressure differential and the second spring 23. When the pressure acting at the first port 3 is greater than the pressure acting at the second port 4 the pressure differential and the second spring 23 ensure that the second port 4 is closed. When the pressure differential is the other way round the pressure differential acts against the spring 23, moving the second valve member 7 relative to the first to open the second port 4, permitting fluid flow between the ports.

The assembly 1 can therefore operate to allow fluid flow in either direction by appropriate control of the solenoid 9 and the pressure differential.

The assembly 1 has a simple and light construction as it has only one solenoid, which also has the advantage of simplifying the control of the assembly. Further, in the arrangement shown, the valve-operating forces can be minimised, as the solenoid does not move the first valve member 6 if a significant pressure differential is acting against it. The use of the biassing means provides positive closure of the two parts by their respective valve members.

The control valve assembly can be used in any hydraulic systems where these features are advantageous, in particular, in high pressure systems. The relative forces provided by the solenoid and the biassing means may be altered to suit the operating pressure and operation of the system.

We claim:

1. A fluid flow control valve assembly comprising a housing, first and second fluid flow ports provided in said housing, said first and second ports being the only fluid flow ports in said housing, a valve means for controlling fluid flow between said ports, said first and second ports having respective first and second seats, and said valve means comprising first and second relatively movable valve members, said first valve member controlling fluid flow through said first port, and being movable between a closed position in which it engages said first seat to prevent fluid flow through said first port, and an open position in which it is spaced from said first seat to permit fluid flow through said first port, movement of said first valve member being controlled by a first biassing means urging said first valve member to close said first port, a valve-operating means for producing a force urging said first valve member to open said first port, and means producing a pressure differential across said first valve member; said second valve member controlling fluid flow through said second port, and being movable between a closed position in which it engages said second seat to prevent fluid flow through said second port, and an open position in which it is spaced from said second seat to permit fluid flow through said second port, movement of said second valve member being controlled by said first valve member, means producing a pressure differential across said second valve member and second biassing means urging said second valve member to close said second port, said valve means having first, second and third operating states, a first state in which said first valve member is in said closed position and said second valve member is in said open position, a second state in which said second valve member is in said second position and said first valve member is in said open position, and a third state in which said first and second valve members are in said open positions to permit fluid communication between said ports.

2. A fluid flow control valve assembly as claimed in claim 1, wherein said valve-operating means comprises a solenoid.

3. A fluid flow control valve assembly as claimed in claim 2, wherein said valve means is in said first operating state when said solenoid is de-energised and said first biassing means urges said first valve member into said closed position, with said pressure differential across said first valve member being unable to move said first valve member into said open position, and said valve means changes to said third operating state when said pressure differential across said first valve member acts against said first biassing means to move said first valve member to open said first port without closing said second port.

4. A fluid flow control valve assembly as claimed in claim 2, wherein said valve means is in said second operating state when said solenoid is energised, to cause said first valve member to open said first port, and said second biassing means urges said second valve member into said closed position, with said pressure differential across said second valve member being unable to move said second valve member into said open position, and said valve means changes to said third operating state when said pressure differential across said second valve member acts against said second biassing means to move said second valve member to open said second port.

5. A fluid flow control valve assembly as claimed in claim 1, wherein said first and second biassing means comprise respective first and second springs.

6. A fluid flow control valve assembly as claimed in claim 1, wherein said first valve member is provided with a bore, and said second valve member works in said bore in said first valve member.

7. A fluid flow control valve assembly as claimed in claim 1, wherein said first and second valve members are connected by a mechanism providing limited relative movement between said valve members.

8. A fluid flow control valve assembly as claimed in claim 7, wherein said mechanism comprises a pin and slot connection.

* * * * *